G. S. EVERHART.
NON-SKID CHAIN.
APPLICATION FILED JULY 14, 1917.
1,314,737.
Patented Sept. 2, 1919.
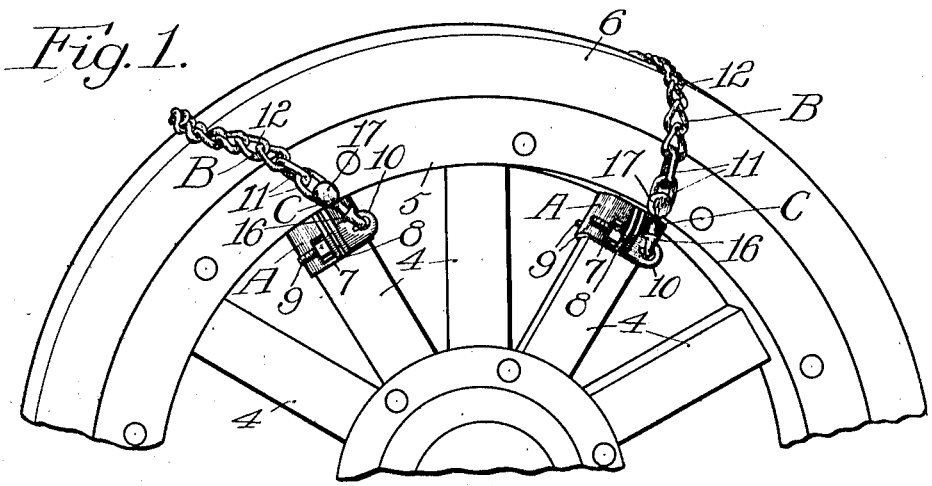
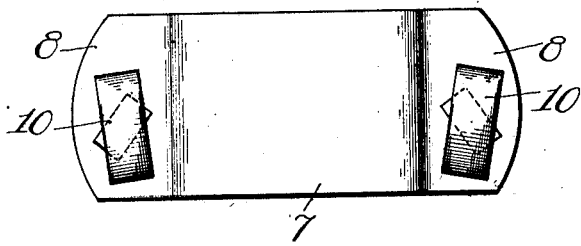
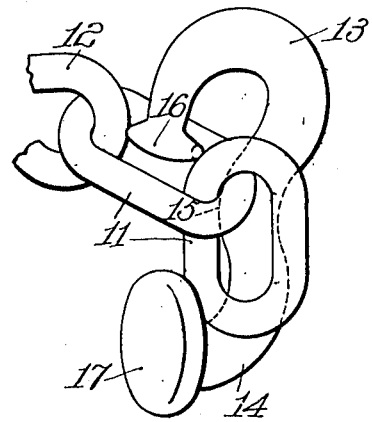
Witnesses:
Inventor
George S. Everhart
By William Bradbury &Lee
Attorneys

UNITED STATES PATENT OFFICE.

GEORGE S. EVERHART, OF OSHKOSH, WISCONSIN.

NON-SKID CHAIN.

1,314,737. Specification of Letters Patent. Patented Sept. 2, 1919.

Application filed July 14, 1917. Serial No. 180,520.

*To all whom it may concern:*

Be it known that I, GEORGE S. EVERHART, a citizen of the United States, residing at Oshkosh, in the county of Winnebago and State of Wisconsin, have invented a certain new and useful Improvement in Non-Skid Chains, of which the following is a full, clear, concise, and exact description, reference being had to the accompanying drawings, forming a part of this specification.

My invention relates to non-skid chains for motor driven vehicles, and more specifically is concerned with the provision of a cheap, strong, and efficient device of this class particularly adaptable for use in connection with motor truck wheels of the type commonly provided with solid tires.

The non-skid chain hereinafter described is characterized not only by the fact that the chain, which in use extends from a spoke around the wheel felly and tire, readily may be connected with and disconnected from the spoke, but furthermore by the fact that the effective length of the chain readily may be adjusted as occasion may require.

In the accompanying drawings illustrating my invention,

Figure 1 is a fragmentary view in perspective of a vehicle wheel provided with the improved non-skid device of my invention;

Fig. 2 is an elevational view of one of the spoke engaging clamps; and

Fig. 3 is a perspective view of one of the chains and the device for coupling the same to the spoke engaging clamps.

Similar characters of reference refer to similar parts throughout the several views.

In Fig. 1 of the drawings I have illustrated a portion of a truck wheel comprising the spokes 4—4, felly 5, and solid tire 6. Any desired number of the wheel spokes, conveniently every alternate spoke, are provided with non-skid units each of which comprises a spoke engaging clamp A, chain B, and a pair of coupling devices C—C, with the conformation and use of which my present invention is particularly concerned.

Although my present invention is not particularly directed to the construction of the spoke engaging clamp, I will say that each of the same may comprise the plates 7—7 conformed to receive the spoke clamped between them. The plates 7—7 of each spoke engaging clamp are provided with ears 8—8 and are secured together by bolts 9—9 passing through apertures in the said ears 8—8. Although not shown the plates 7—7 may, of course, be lined with rubber or other suitable material. The apertures in the ears 8—8, as well as those portions of the clamping bolts which engage therein, are desirably given polygonal cross sections so that rather large flat bolt heads 10—10 are held at the inclination shown in Fig. 2, thereby rendering it possible to pass the coupling members C—C through the bolt head apertures, as will presently be explained. Each of the spoke engaging clamps just described is ordinarily, although not necessarily, left permanently on the wheel after being positioned as shown in Fig. 1.

I have shown each of the chain lengths B as comprising at its ends a plurality of flat links 11 joined by the twisted links 12 which lie against the tire. The ends of each chain length B are detachably connected with the bolt heads 10—10 of its associated spoke engaging clamp A by the coupling devices C—C, each of which is in the form of an integral drop forging comprising the two hook portions 13 and 14 separated by the intermediate hump 15.

The hook portion 13 of each coupling device C is conveniently provided with a substantially T shaped extremity 16 which, while permitting insertion of the hook 13 in the aperture of its associated bolt head 10, effectually prevents its accidental disengagement therefrom, the substantially key-hole slot shape of the bolt head aperture and the T shaped extremity of the hook 13 requiring that when the coupling member C is to be disengaged from its associated bolt head aperture the said coupling be turned to a position that it does not assume in the normal use of the non-skid device.

It will be noted that the hook portion 14 of each coupling device C is designed to receive one of the end lengths of its associated chain B, the enlarged extremity 17 of the hook 14 preventing disengagement of the chain and coupling when the hook portion 13 of the latter engages in its associated bolt head aperture. It will be noted, however, that if for any reason it becomes necessary or desirable to shorten the effective length of one of the chains B that it readily may be accomplished by slipping one or both of the end links of the chain off the coupling members C by way of the hooks 13 of the latter and then connecting said coupling with the chain by passing the hooks 13 through other links of the chain.

The hump 15 intermediate the hook portions 13 and 14 of each coupling device C tends to prevent the connected link of its associate chain B from slipping up into the hook portion 13 when the device is in use.

While I have illustrated but one arrangement for detachably connecting the coupling element C with the spoke engaging clamps it will be understood that my invention contemplates the use of any suitable arrangement to accomplish this purpose.

Having thus described my invention what I claim as new and desire to secure by Letters Patent of the United States is:

The combination with a chain comprising a plurality of links, of a coupling member adapted to be manipulated through one of said links, said coupling member comprising a shank portion having an extension bent at substantially right angles to said shank portion, the said extension being provided at its end with an enlargement for preventing said end from passing through the link with which said coupling member is engaged, the other end of said shank portion being bent upon said shank portion and being of such size as to pass through said link.

In witness whereof, I hereunto subscribe my name this 10th day of July, 1917.

GEORGE S. EVERHART.

Witnesses:
A. G. McCALEB,
MARY A. COOK.